Oct. 29, 1968 L. C. FRAZIER 3,408,244
TIRE ASSEMBLING APPARATUS AND APPARATUS FOR
FORMING SIDE WALLS FOR TIRES
Filed April 28, 1965 8 Sheets-Sheet 1

Inventor:-
Larry C. Frazier,

Oct. 29, 1968     L. C. FRAZIER     3,408,244
TIRE ASSEMBLING APPARATUS AND APPARATUS FOR
FORMING SIDE WALLS FOR TIRES
Filed April 28, 1965     8 Sheets-Sheet 4

Inventor:-
Larry C. Frazier,

Inventor:-
Larry C. Frazier,

United States Patent Office 3,408,244
Patented Oct. 29, 1968

3,408,244
TIRE ASSEMBLING APPARATUS AND APPARATUS
FOR FORMING SIDE WALLS FOR TIRES
Larry C. Frazier, Prescott, Ariz., assignor to National-Standard Company, Niles, Mich., a corporation of Delaware
Filed Apr. 28, 1965, Ser. No. 451,436
19 Claims. (Cl. 156—403)

ABSTRACT OF THE DISCLOSURE

Apparatus for fabricating pneumatic tires in which tire carcass material is expanded by pressure into torus configuration to engage the crown of the carcass with a tread component, and while the carcass is expanded engage the circumferential edges or wings of the tread component with the adjacent portions of the carcass, and apply side walls to the carcass with the circumferential edges of the side walls covering the circumferential edges or tread wings of the tread. Apparatus for fabricating side wall components in which side wall material is formed around a cylindrical drum with the drum thereafter being radially expanded and axially contracted forming the side wall material into an annular member, and then severing the annular member at its outer circumference to form a pair of annular side wall components. A drum assembly having end head components movable axially relative to each other each having inner and outer ring members defining seats for a bladder and bead ring seats between the inner and outer ring members displaceable radially outwardly by relative axial movement of the inner and outer ring members. A drum as last noted in which the bladder is collapsible inwardly and tire carcass material outwardly away from the bladder with the bladder and tire carcass defining an air pressure chamber for displacing the tire carcass material into engagement with a tread component.

The present invention relates to the tire art and is concerned with the assembling of a plurality of components with a tire carcass such as a tread and side wall components in fabricating a tire. In addition, the invention is concerned with the fabrication of tire side wall components and the incorporation thereof with a tire carcass together with other components such as the aforementioned tread and component.

The prior art is replete with methods and apparatus for assembling together the several components of a tire, and one class of the prior art in this respect, as typically shown in my U.S. Patent No. 2,986,196 dated May 30, 1961, comprehends the provision of an expansible carcass building drum which is adapted to be expanded into substantially torus configuration to conformably shape tire carcass material carried thereon and engage the crown portion of the expanded carcass with a tread component of a tire. Approaches of the character noted while satisfactory for their designed and intended purposes are not well suited for applying the circumferential edges or tread wings of a tread to the tire carcass as well as the side walls for a tire, and in addition are inadequate for satisfactorily applying the circumferential edge portions of the side walls over the circumferential edges or tread wings of the tread at the tread shoulders of the tire. The latter operations, in the main, are usually carried out by hand stitching which is time consuming and costly, and unless expertly performed result in inferior tires.

It is an object of the present invention to fabricate a tire by expanding a tire carcass by pressure into torus configuration and engage the crown of the carcass with a tread component, then with the carcass expanded and engaged with tread component attach the circumferential edges or wings of a tread to adjacent surface portions of the carcass, and then apply side walls to the carcass with the circumferential edges of the side walls covering the circumferential edges or tread wings of the tread.

A further object of the invention resides in fabricating a tire as last aforesaid in which the aforementioned components are suitably supported and the carcass subjected to fluid pressure to cause the several components to adhere tightly together.

A further object resides in fabricating a tire as aforesaid in which the carcass itself is expanded into torus configuration by fluid under pressure.

A further object of the present invention concerns the fabrication of side wall components for a tire by wrapping suitable side wall material around a cylindrical drum, displacing the drum radially and contracting it axially to dispose the side wall material into an annular member defined by opposed sides integrally joined at the outer circumference thereof, and then severing such annular member at the outer circumference to provide a pair of annular tire side wall components.

The foregoing and other objects and advantages of the invention will appear from the following detailed description of preferred embodiments of the invention.

Now in order to acquaint those skilled in the art with the manner of fabricating a tire in accordance with the principles of the present invention and for the fabricating of side walls and the incorporation thereof with a tire, there is described below in connection with the accompanied drawings certain preferred embodiments of the invention.

*General arrangement of components of invention*

Figures 1, 2, 3:
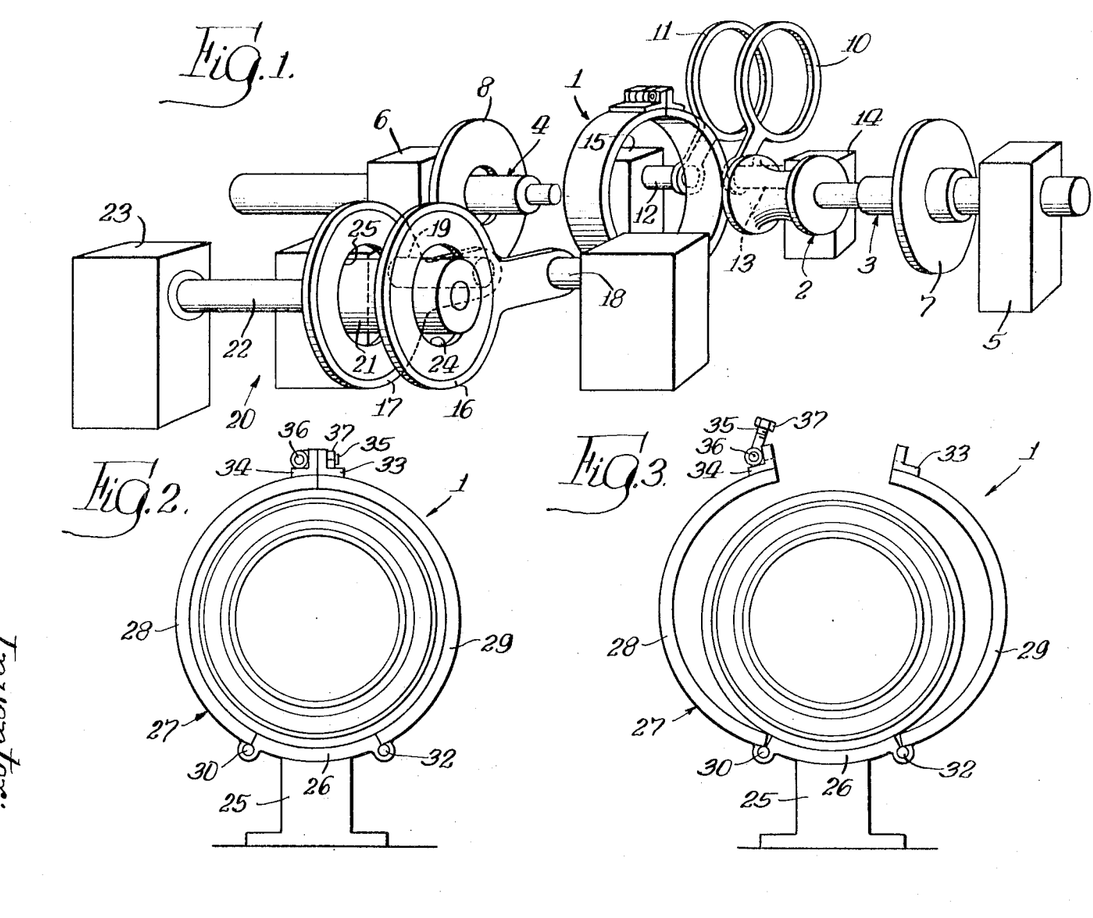
FIGURE 1 is a diagrammatic perspective view of apparatus in accordance with the principles of the present invention.
FIGURE 2 is a side elevational view of a tread component supporting structure or means embodied in the apparatus of FIGURE 1 shown in its closed position.
FIGURE 3 is a side elevational view of the tread component supporting structure of FIGURE 1 in its opened position.

Referring now to FIGURE 1 there is shown a diagrammatic perspective view of the principal elements of the apparatus of the present invention. A tread component supporting ring structure or means 1 for supporting a tread component which may comprise a tread and tread ply (omitted for clarity in FIGURE 1 but shown in FIGURE 29) is suitably supported in stationary relation with respect to a carcass supporting drum 2 in axial alignment with the tread component supporting ring structure 1, and which carcass supporting drum 2, as will appear, may be selectively supported at its opposite ends on shaft means 3 and 4 supported on and movable axially toward and away from mounting structures 5 and 6, respectively. Compressing rings 7 and 8 are journalled on and are adapted to be moved axially relative to the shafts 3 and 4, respectively. A pair of shoulder ring means 10 and 11 are independently rotatably mounted on for axial movement relative to each other on opposed ends of axially aligned shaft means 12 and 13 parallel with and disposed in laterally spaced relation of the shaft means 3 and 4 with the other ends of shaft means 12 and 13 being mounted in suitable frames 14 and 15, respectively. Each of the shoulder ring means 10 and 11 is adapted to be moved from a first or inoperative position, as shown in FIGURE 1, to a second or operative position at which they are disposed one each at opposite sides of the tread component supporting ring structure or means 1 for purposes to be described below. A pair of side wall plates 16 and 17 are independently rotatably mounted and axially movable relative to each other on opposed ends of axially aligned shaft means 18 and 19 extending parallel with the shaft means 3 and 4 laterally opposite the shaft means 12 and 13 and are movable from a first position, shown in FIGURE 1, away from the tread component supporting ring structure or means 1 to a second position at which one each of the side wall plates 16 and 17 is disposed at opposite sides of the tread component supporting ring structure or means 1. If desired, tire side wall building means, indicated generally at 20, may be associated with the aforedescribed elements which comprises a side wall building drum 20 mounted on drum shaft means 22 supported at one end in a housing 23. The drum shaft means 22 lies on an axis parallel with the axis of shaft means 18 and 19 laterally outwardly thereof and side wall building drum 20 is movable axially of shaft means 22 from a first or operative side wall forming position, as shown in FIGURE 1, at which it lies within the circular openings 24 and 25 of the side wall plates 16 and 17, respectively, to a second or inoperative position at which it lies toward the housing 23 and free of the side plates 16 and 17. Briefly, and as will be described in detail below, a tread component which may, for example, comprise a tire tread and inwardly lying reinforcing tread ply is suitably mounted in the tread component supporting ring structure or means 1. The shoulder rings 10 and 11 are then disposed to their second or operative positions one at each side of the tread component supporting ring or means 1. The tire carcass is mounted on the carcass supporting drum assembly 2 and the drum assembly 2 then moved axially to centrally locate the tire carcass within the tread component supporting structure or means 1. As will be explained below in detail, the tire carcass is then radially expanded and axially contracted to form the carcass into torus configuration and engage the crown of the carcass with a tread ply lying inwardly of and secured to the tire tread to adhere the tread ply and tread to the crown of the carcass. The shoulder ring means 10 and 11 hold the circumferential edges or wings of the tire tread in position. At this juncture the side wall plates 16 and 17 are disposed one each adjacent and outwardly of shoulder ring 10 and 11, respectively, the opposite ends of the carcass drum assembly 2 being alternately supported on shaft means 3 and 4 for this purpose. Thereafter, the side wall plates 16 and 17 and the shoulder ring means 10 and 11, respectively, are moved axially toward each other, as will be described in greater detail below, to attach the circumferential edges or wings of the tread to the carcass at the tread shoulders for the tire. Thereafter, the side wall plates 16 and 17 and the shoulder ring means 10 and 11 are disposed to their positions away from the tread component supporting ring structure or means 1. The inside surfaces of the side wall plates 16 and 17 are provided with suitable side wall components and the side wall plates 16 and 17 are then again located one at each side of the tread component supporting ring structure or means 1. The side wall plates 16 and 17 are then again moved axially relatively toward each other to apply the side wall components to the sides of the carcass lying within the tread component supporting ring or means 1.

After application of the side walls to the carcass the side wall plates 16 and 17 are again disposed to their first positions away from the tread component supporting ring structure or means 1. After this, the shoulder ring means 10 and 11 are moved to their aforementioned second or operative positions and the side wall plates 16 and 17 are moved to their second positions adjacent to shoulder ring means 10 and 11, respectively, whereupon the side wall plates 16 and 17 are moved axially toward each other and by their engagement with shoulder ring means 10 and 11 apply the outer circumferential portions of the side walls to the tire at the shoulder portions of the latter and at the circumferential edges or tread wings of the tread. With the parts in the position last noted, the compression rings 7 and 8 are moved axially inwardly to operative positions at which they engage the side wall plates 16 and 17 and the tire carcass is inflated to tightly press all components of the tire together. After assembly of the components, as above described, the pressure retaining the carcass in its torus form is released, the compression plates 7 and 8 disposed to their inoperative positions, the side wall plates 16 and 17 are disposed to positions away from the tread component supporting ring structure or means 1, and the shoulder ring means 10 and 11 are disposed to their inoperative positions. Thereupon, the tread component supporting ring structure or means 1 is opened and the assembled tire removed therefrom. The carcass drum assembly 2 is then returned to its starting position shown in FIGURE 1 and the assembled tire is removed from the carcass drum assembly following which another carcass is then mounted on the drum of the carcass drum assembly for assembling the components for the next tire.

Also, as diagrammatically shown in FIGURE 1, the present invention comprehends apparatus for fabricating side walls for a tire. As will be described later, the side wall material may be applied to the inside surfaces of the side wall plates 16 and 17 in the position shown in FIGURE 1 and then applied to the tire carcass as above described in the sequence of movement of the side wall plates 16 and 17 opposite the tread component supporting ring structure or means 1 as above described. Also, if desired, the tire side walls may be fabricated by means of the side wall drum 20, side wall plates 16 and 17 and other components described below for application to the inside surfaces of side wall plates 16 and 17 and then to the sides of a tire carcass.

*Tread component supporting structure or means*

In FIGURES 2 and 3 it will be seen that the aforementioned tread component supporting structure or means 1 is defined by a base support member 25 having a stationary arcuate segment 26 of ring means 27 mounted thereon. A pair of movable arcuate segments 28 and 29 are pivotally mounted at one end each thereof as at 30 and 32 at opposite ends of the stationary segment 26. A bifurcated bracket 33 is mounted at the free end of segment 29 and a bracket 34 is mounted at the free end of segment 28. A bolt 35 is pivotally mounted at one end as at 36 in bracket 34 and a retaining nut 37 has threaded engagement with the outer threaded end of the bolt. The shank of the bolt 35 is adapted to be disposed in a slot of the bifurcated bracket 33 and the nut 37 tightened to retain the segments 26, 28 and 29 in annular or ring form and in closed position as shown in FIGURE 2. The ring means 27 may be opened upon loosening of nut 37 so that the bolt may be swung away to the position shown in FIGURE 3 to permit moving of the arcuate segments 28 and 29 to open position for purposes of initially assembling a tread component in the supporting structure 1 and to enable removal of the assembled components of a tire.

*Carcass supporting drum assembly or means*

Figure 4:
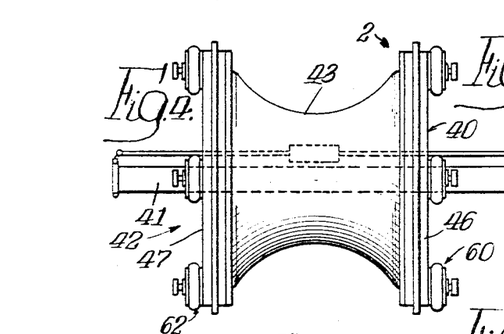
FIGURE 4 is a side elevational view of the carcass supporting drum assembly of the apparatus of FIGURE 1 showing the assembly in its relaxed or opened position for receiving a tire carcass.
Figure 5:
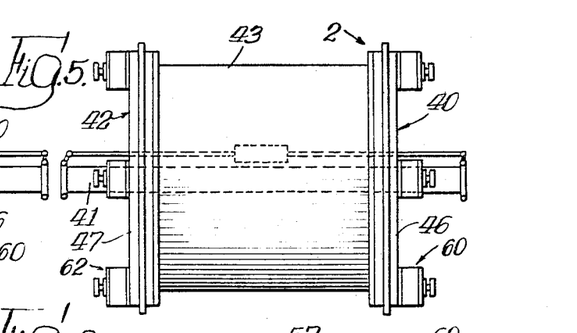
FIGURE 5 is an elevational view of the carcass supporting drum assembly of FIGURE 4 in its extended or closed position.
Figure 6:
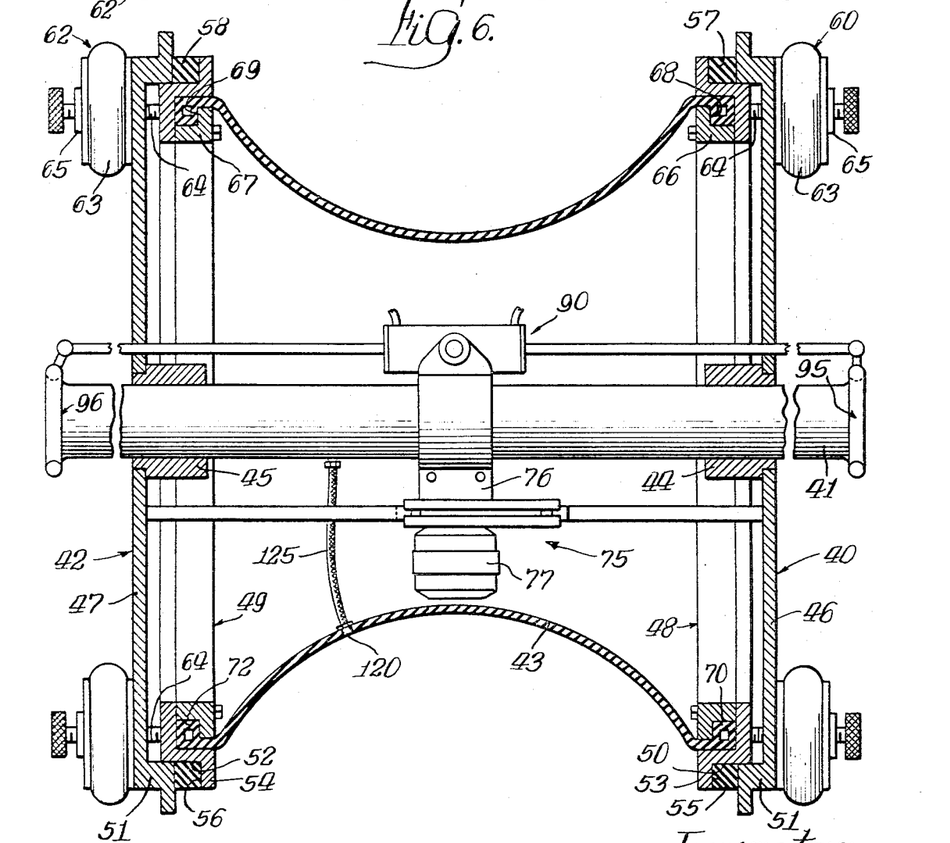
FIGURE 6 is a vertical sectional view of the carcass supporting drum assembly of FIGURE 4.
Figure 13:
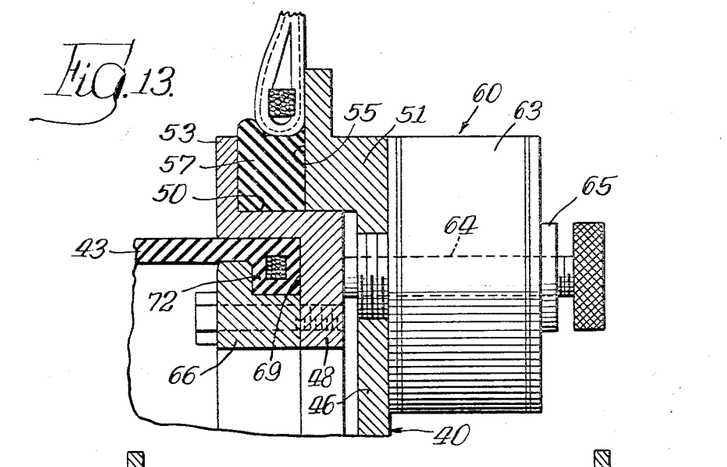
FIGURE 13 is a detail sectional view showing the manner in which the drum bladder of the drum of the assembly of FIGURE 1 is secured to the end walls of the drum and means by which the bead rings of a tire carcass are mounted in air tight relation on bead ring seats of the drum.

The carcass supporting drum assembly or means 2 of FIGURE 1 is shown in detail in FIGURES 4 through 13 to which reference may now be had. The carcass drum assembly or means 2 as shown in FIGURES 4 and 5 comprises annular end head components 40 and 42 between which a tubular bladder 43 extends. The bladder 43 may be made of rubber or like displaceable material preferably reinforced by inextensible cords extending axially thereof to resist axial deformation of the bladder. As best seen in FIGURE 6, a drum hub 41 extends axially of and within the blader 43 and bushings 44 and 45 of the end head components 40 and 42 provide for relative axial movement of the end head components 40 and 42 toward and away from each other. The end head components 40 and 42, as best seen in FIGURES 6 and 13, are defined by outer end members 46 and 47 and inner annular ring members 48 and 49, respectively. The outer end members 46 and 47 are formed with outer annular flanges 51 on which internal shoulders 50 and 52 of the inner ring members 48 and 49, respectively, seat for sliding engagement therewith. The inner ring members 48 and 49 are formed with radially outwardly extending flanges 53 and 54 with which the annular flanges 51 of outer end members 46 and 47 define annular recesses 55 and 56 in which resilient annular bead ring seat members 57 and 58, respectively are disposed. The bead ring seats 57 and 58 are preferably formed of elastic deformable material, such as rubber, and are adapted to be expanded radially outwardly by a plurality of bead seating means 60 and 62 disposed and spaced apart in circumferential relation at the outer surfaces of the end members 46 and 47, respectively. The bead seating means 60 and 62 are all of like construction and each comprises an air bag 63 through which a stem 64 extends. The stems 64 have enlarged outer ends 65 which seat against the outer end surfaces of the air bags 63. The stems 64 of the bead seating means 60 also extend through outer end member 46 and the stems 64 of the bead seating means 62 extend through the outer end member 47 and the inner ends of the several stems 64 are secured to the inner ring members 48 and 49, respectively. Thus, upon admission of air under pressure to the air bags 63 of the bead seating means 60 and 62, the inner ring members 48 and 49 are moved axially toward outer end members 46 and 47, respectively, to radially outwardly expand the bead ring seats 57 and 58 to provide, as will be described below, air tight seals at the beads of a tire carcass supported on the drum of the carcass drum assembly 2. Upon release of air under pressure from bags 63 of the bead seating means 60 and 62, the bead ring seats 57 and 58 return to their normal shape and position and effect axial movement of the inner ring members 48 and 49 away from the outer end members 46 and 47, respectively. The inner ring members 48 and 49 also provide for the support of the opposite ends of the tubular bladder 43 and for this purpose embody inner annular retainer members 66 and 67 forming annular recesses 68 and 69, respectively, for receiving the annular beads 70 and 72 at opposite ends of tubular bladder 43.

Figures 7, 8, 9, 10, 11, 12:
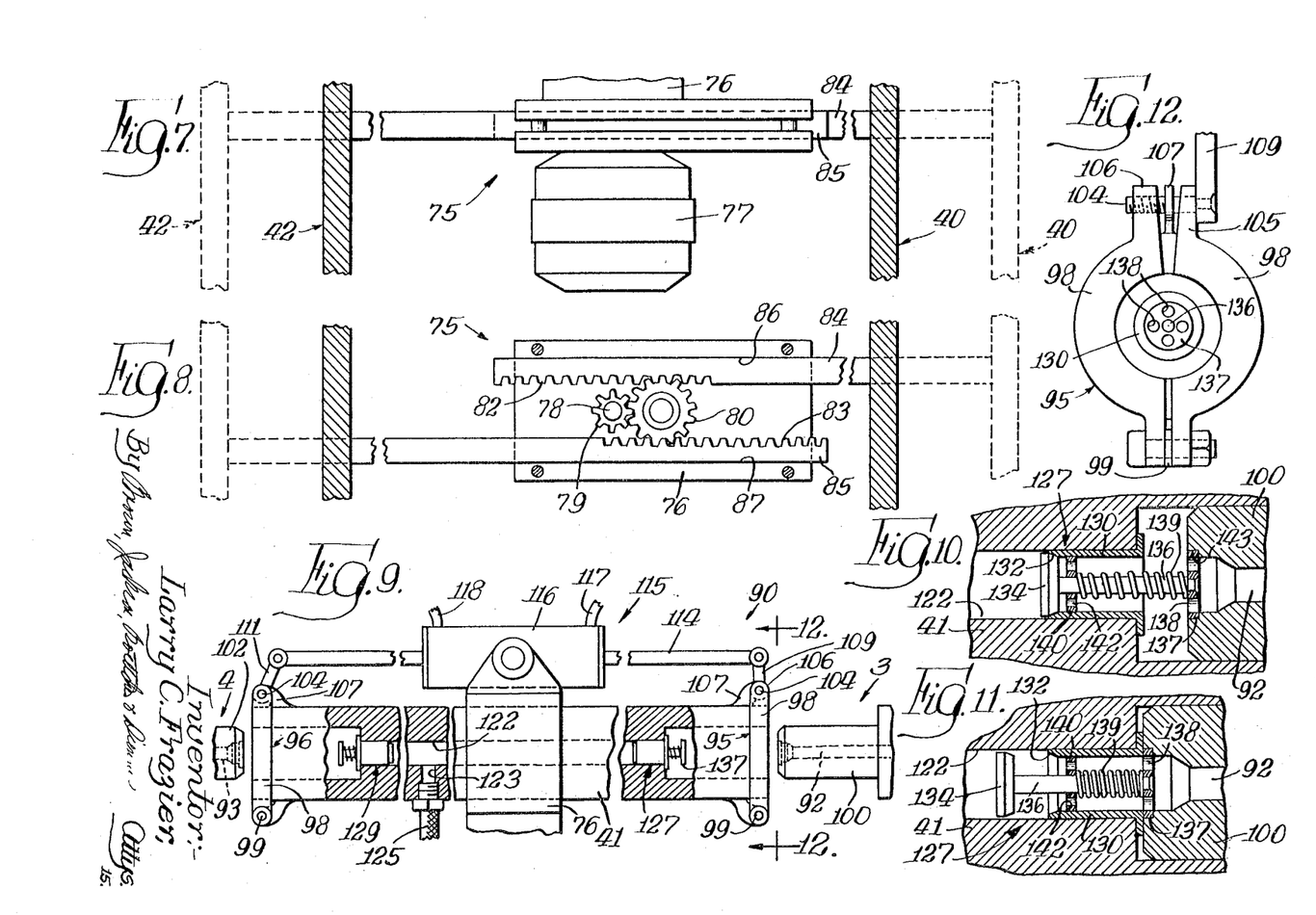
FIGURE 7 is a plan view of means for moving end bead components of the drum of drum assembly of FIGURE 4 comprising rack and pinion means embodied in the carcass supporting drum assembly of FIGURE 4 and motor for actuating the rack and pinion means.
FIGURE 8 is an end view of the rack and pinion means of FIGURE 7.
FIGURE 9 is an elevational view of the drum hub of the carcass supporting drum assembly of FIGURE 4 partly broken away to show air control valve means embodied therein.
FIGURE 10 is a detail vertical sectional view of one of the air control valves of the drum hub of FIGURE 9 with the valve in closed position and in association with an end portion of shaft means for supporting the carcass supporting drum assembly.
FIGURE 11 is a sectional view of the air control valve of FIGURE 10 in opened position.
FIGURE 12 is an end view of the drum hub of FIGURE 9 with the view being taken substantially along the line 12—12 of FIGURE 9 and looking in a direction indicated by the arrows.

The carcass drum assembly 2, as best seen in FIGURES 6, 7 and 8, further comprises bead moving means 75 for moving the annular end head components 40 and 42 axially toward and away from each other defined, in part, by bracket 76 fixed to and intermediate the ends of drum hub 41. The bead moving means 75 further comprises an electric motor 77 supported by bracket 76 and in which the armature 78 of the motor 77 carries a pinion 79 having meshing engagement with a pinion 80 which, in turn, engages gear teeth 82 and 83 of racks 84 and 85, respectively, and which racks 84 and 85 have guided engagement in ways 86 and 87 of bracket 76 and have their outer ends suitably connected with end head components 40 and 42, respectively. In FIGURE 8 the end components 40 and 42 are shown in full lines in their axial inward positions with respect to each other at which the tubular bladder 43 is in its collapsed or relaxed condition as shown in FIGURES 4 and 6. When the end head components 40 and 42 are disposed in their axially outwardly spaced apart position, as illustrated in dotted lines in FIGURE 8, by operation of bead moving means 75, the tubular bladder 43 is extended to substantially cylindrical configuration, as shown in FIGURE 5, between the end head components 40 and 42. The functions performed with the end head components 40 and 42 at their inner and outer positions with respect to each other will be described in detail below in describing the mode of operation of the apparatus. The carcass drum assembly 2 as best seen in FIGURES 9 and 12 further comprises drum supporting means 90 formed in part by the aforementioned drum hub 41 and associated components for supporting the drum assembly selectively on shaft means 3 and 4 which are ported as indicated at 92 and 93, respectively, for connection with a source of air under pressure (not shown). The drum hub 41 at its outer ends is provided with clamping means 95 and 96, respectively, each of which, as shown in detail with respect to clamp means 96 in FIGURE 12, comprise a pair of split rings 98—98 resiliently connected at their lower ends as at 99 to afford for movement at the opposite ends of the split rings 98—98 toward and away from each other and to clamping and non-clamping relation with respect to shaft extension 100 and 102 of shaft means 3 and 4, respectively. The split rings 98 of clamp means 95 and 96 are moved toward and away from each other by threaded studs which extend through ears 105 of one of the clamp rings 98 and having threaded engagement with the ears 106 of the other of the split rings 98. The studs 104 intermediate their ends are supported in lugs 107 at the opposite ends of the hub 41. The stud 104 of clamp means 96 is, for example, provided with right hand threads while the stud 104 of clamp means 96 is formed with left hand threads. Operating levers 109 and 111 have connection with the studs 104 of the clamp means 95 and 96, respectively, and to a piston rod 114 of a piston and cylinder assembly 115 including a cylinder 116 to which air under pressure may be selectively admitted at either end through leads 117 and 118. Thus, by admitting air through lead 118, the piston rod 114 is moved to the right which affects tightening of clamp means 95 and loosening of clamp means 96. By such energization of the piston and cylinder assembly 115, the drum assembly 2 may be secured and supported by extension 100 of shaft means 3 by releasing the drum assembly from extension 102 of shaft means 4. Conversely, it will be clear that by admitting air to cylinder 116 through lead 117 that the drum assembly 2 may be connected to and supported on extension 102 of shaft means 4 and released from extension 100 of shaft means 3.

The hub 41 as will be clear from FIGURES 6 and 9 through 11 includes means for admitting air under pressure selectively from the ported extensions 100 and 102 of shaft means 3 and 4, respectively, and which shaft means 3 and 4 have suitable connection with a source of air under pressure provided with suitable control valve means (not shown), through a valve or orifice 120 in the wall of bladder 43. For this purpose, it will be noted that the hub member 41 is provided with air passageway means defined by an axially extending bore 122 from which a branch bore 123 extends to a conduit 125 leading to the valve or orifice 120. Valve assemblies 127 and 129 are arranged at opposite ends of the bore 122. The valve assemblies 127 and 128 are of like construction in view of which only valve assembly 127 will be described in connection with FIGURES 10 and 11 of the drawings. In the latter figures, it will be seen that valve assembly 127 comprises a valve body 130 having a valve seat 132 at the inner end thereof. A valve member 136 is mounted for axial movement in the valve body 130 and comprises a valve 134 adapted to be disposed in seated and unseated relation with respect to valve seat 132. A valve rod 136 extends from valve 134 and at its other end carries a valve actuating member 137 which, as seen, is provided with a plurality of ports 138. A coil spring 139 surrounds the valve rod 136 and is retained under compression against a reaction member 140 mounted in fixed relation within the valve body 130 and the valve actuating member 137. The reaction member 140 as shown in FIGURES 10 and 11 is provided with a plurality of ports 142. In the normal position of the parts as shown in FIGURE 10, it will be observed that the compression spring 139 effects seating of the valve 134 on the valve seat 132 and with the valve actuating member 137 projecting axially outwardly away from the outer end of the valve body. In FIGURE 10 a portion of the extension 100 of shaft means 3 is shown in an advanced position within the adjacent end of drum hub 41 in the operation of supporting the carcass drum assembly 2 on the extension 100 at which the valve actuating member 137 is received in a counter-bore 143 at the outer end of extension 100. Upon further movement of shaft means 3 to the left, the actuating member is advanced inwardly disposing the valve 134 to open position with respect to valve seat 132 by compressing of coil spring 139 between the actuating member 137 and the ported reaction member 142 to thus provide for admission of air from the bore 92 of shaft extension 100 through the ports 138 of the reaction member 137 into the valve body and through ports 142 of the reaction member 140 outwardly of the valve body and into the bore 122 of the air passageway means in the hub 41, and thence through branch bore 123 and conduit 125 to the outlet orifice or valve 120 and bladder 43. As above mentioned, the valve assembly 129 is of identical construction to that described in connection with air valve assembly 127 and provides for admission of air under pressure when the drum assembly 2 is supported on shaft extension 102 of the shaft means 4 through bore 93, the valve assembly 127 and into the bore 122 of the hub member 41 and from thence through the branch bore 123 to conduit 125 to the valve or orifice 120 of bladder 43. Thus, with the drum assembly 2 supported on either of the extensions 100 and 102 of the shaft means 3 and 4 air is adapted to be admitted to the air passageway means formed by bore 122 for delivery through the conduit 125 to the valve or orifice 120 of the bladder and when the carcass drum assembly is thus supported at either of its ends, the air valve means at the opposite and unsupported end is closed so as to prevent the escape of air from the hub member 41 except through the valve or orifice 120 in the bladder 43.

*Side wall building drum assembly*

Figure 14:
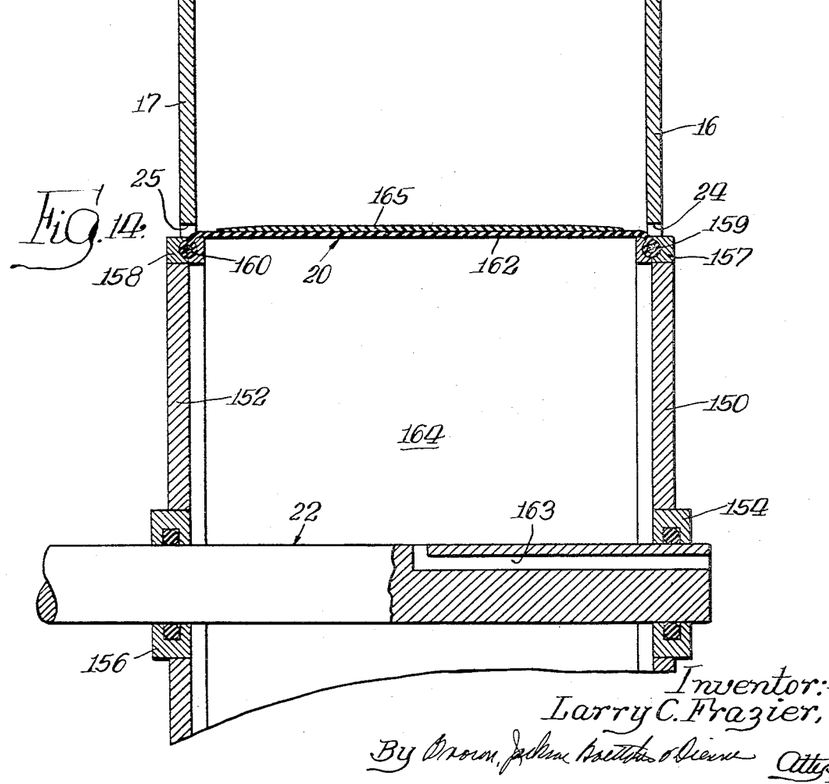
FIGURE 14 is a vertical sectional view through a portion of the side wall building drum showing side wall material wrapped thereon.
Figure 15:
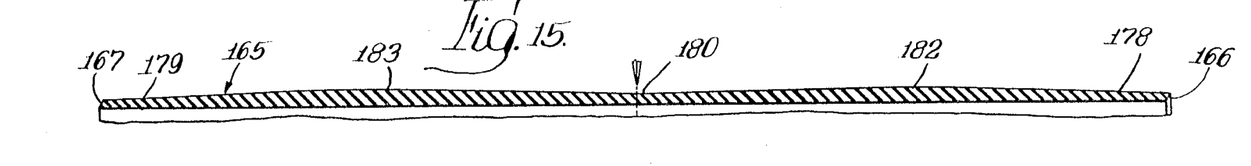
FIGURE 15 is a lengthwise cross sectional view of a portion of the side wall material for application to the drum of FIGURE 14.
Figure 16:
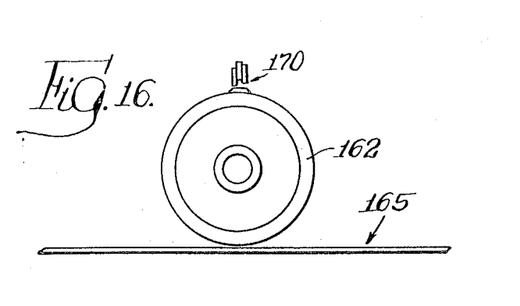
FIGURE 16 is a diagrammatic end view of the side wall building drum and side wall material in position for applying the side wall material to the side wall building drum.
Figure 17:
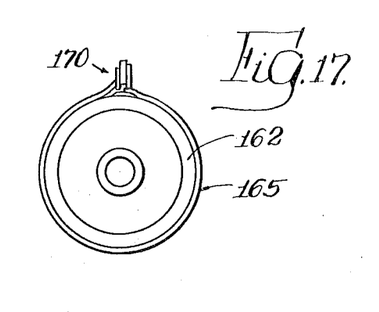
FIGURE 17 is a diagrammatic end view of the side wall building drum with the side wall material substantially wrapped around the drum.
Figure 18:
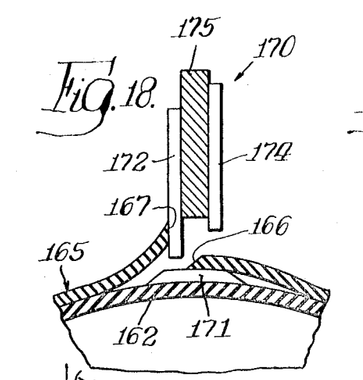
FIGURE 18 is a diagrammatic view of stitching means for stitching adjacent edges of wrapped sheet side wall material on the side wall forming drum with the stitching means shown in its initial or starting position.
Figure 19:
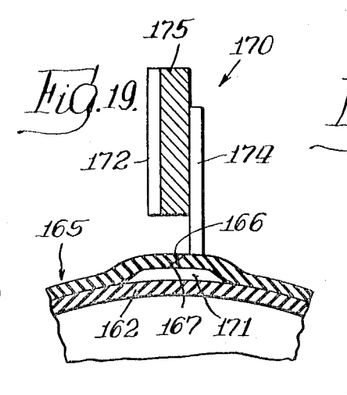
FIGURE 19 is a view of the stitching means of FIGURE 18 in a position to permit adjacent bevelled edges of the side wall sheet material to overlap.
Figure 20:
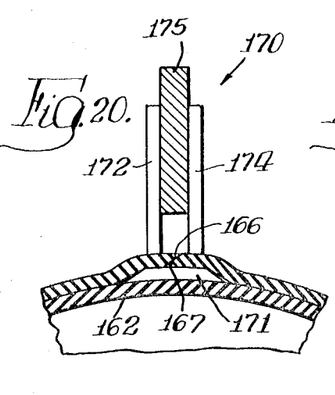
FIGURE 20 is a view of the stitching means of FIGURE 18 in a position to hold adjacent edges of the side wall material in position to be stitched.
Figure 21:
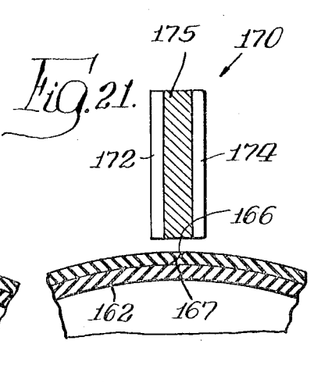
FIGURE 21 is a view of the stitching means of FIGURE 18 in position to stitch the overlapping bevelled edges of the side wall sheet material.

As best seen in FIGURE 14, the side wall building drum 20 comprises a pair of annular end plates 150 and 152 mounted adjacent their inner peripheries for rotation and relative axial movement with respect to each other on drum shaft means 22 by suitable air sealed bearing assemblies 154 and 156, respectively. The annular end plates 150 and 152 at their outer peripheries have affixed thereto bead ring retainers 157 and 158, respectively, in which the bead rings 159 and 160 at the opposite ends of a tubular side wall bladder 162 are mounted to support the bladder 162 axially of and between the end plates 150 and 152. The shaft means 22 is provided with air passageway means 163 through which air under pressure is adapted to be admitted into an annular chamber 164 formed by the outer surface of shaft means 22 between bearing assemblies 154 and 156, the inner surfaces of end plates 150 and 152, and the inner surface bladder 162. The bladder 162 is preferably formed of rubber or like displaceable material and is preferably reinforced axially to resist or restrain axial growth of the bladder in operation of the apparatus. Side wall material for a tire is suitably applied to the outer surface of the bladder 162. The side wall material may be tubed for mounting on the bladder 162. Alternately, the side wall material may be formed from a calendered sheet of desired shape and thickness suitable for the side walls of a tire, such as shown at 165 in FIGURE 15 with such sheet material having its opposite edges bevelled in opposite directions as indicated at 166 and 167. The sheet material 165 as shown in FIGURE 16 is positioned relative to the outer surface of the bladder 162 with the latter disposed in cylindrical form for wrapping around the bladder. The opposite ends of the sheet material are disposed in the positions shown in FIGURE 18 and relative to stitching means 170 as shown in FIGURES 17 and 18. The stitching means 170 comprises a pressing plate 171 which is positionable to extend axially of bladder 162 below the edges 166 and 167 of sheet material 165. The stitching means 170 further comprises a first presser bar 172 which in its initial radial inward or operative position abuts the bevel edge 167 in the wrapping of the sheet material around the drum. With the bevels 166 and 167 disposed in the position shown in FIGURE 18 the presser bar 172 is moved radially outwardly to its inoperative position so that the bevel edges 166 and 167 mate or form an abutting joint at the side edges of the sheet material. In the position of the parts shown in FIGURE 19, a second presser bar 174 has been moved from an inoperative to an operative position radially inwardly to hold the sheet material 165 adjacent the bevel edge 166. Thereafter, the presser bar 172 is moved radially inwardly to its operative position in engagement with the sheet material 165 adjacent the bevel edge 167. With the sheet material 165 thus being held by the presser bars 172 and 174, a third presser bar 175 is moved from its inoperative position to operative position radially inwardly to join or stitch together the bevel edges 166 and 167 of the sheet material 165. Upon stitching of the bevel edges of the sheet material wound around the side wall drum in the manner noted, the stitching assembly 175 is removed by axially sliding the supporting plate 171 axially outwardly from between the bladder 162 and the stitched bevelled ends of the sheet material.

Figures 22, 23, 24, 25, 26, 27, 28:
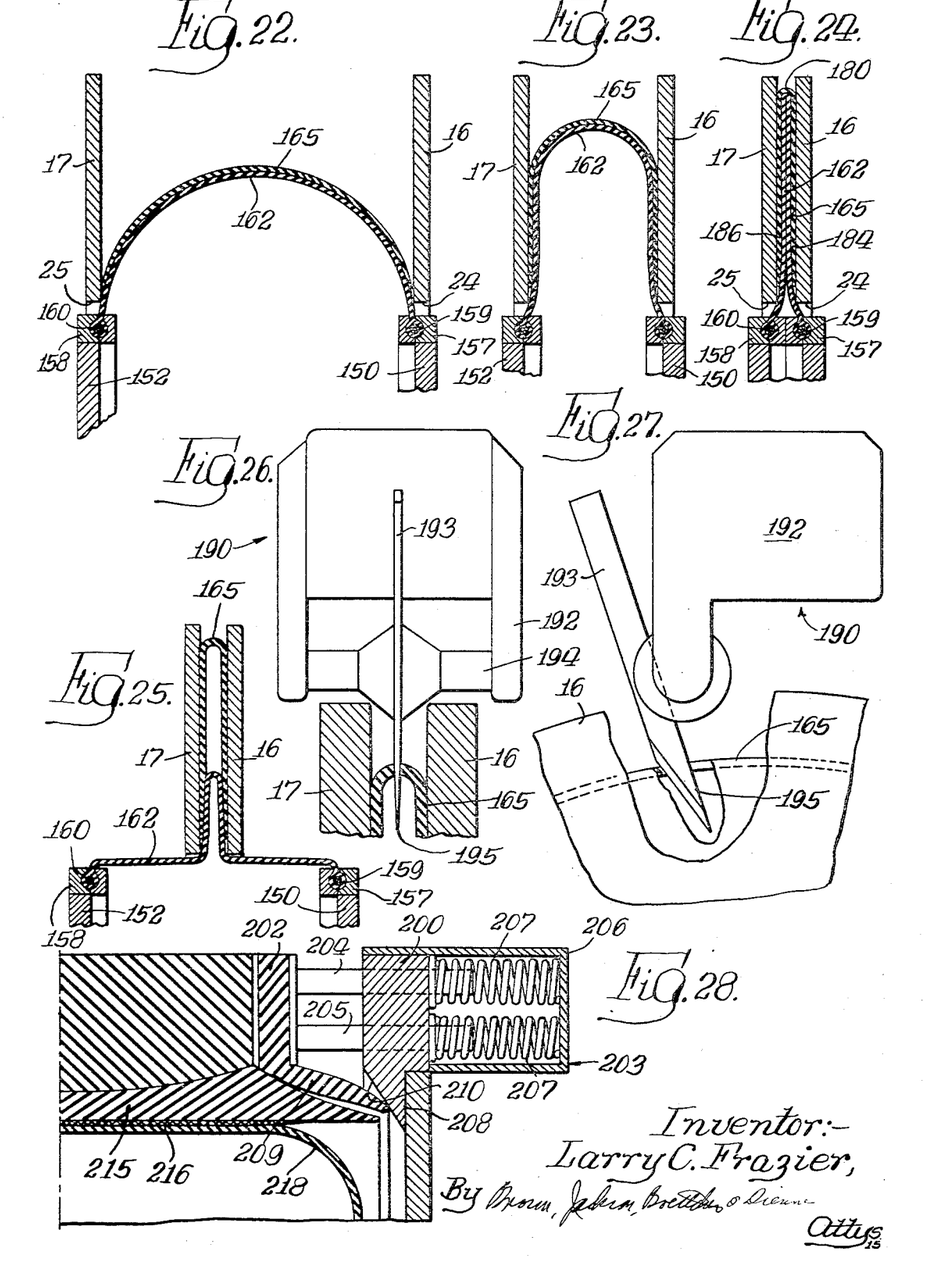
FIGURE 22 is a vertical sectional view of a portion of the side wall building drum and side wall material thereon together with side wall plates disposed relative thereto in an initial position of radially expanding the side wall material wrapped on the drum.
FIGURE 23 is a view similar to FIGURE 22 but showing the further radial expansion of the side wall building drum and the side wall material thereon.
FIGURE 24 is a view similar to FIGURE 23 and in which the side wall building drum and side wall material are extended to their full radial position.
FIGURE 25 is a view similar to FIGURE 24 showing the side wall material applied to the side wall plates and with the side wall drum being radially contracted.
FIGURE 26 is an end view of severing means for severing the side wall material as formed in FIGURE 25 at the outer periphery thereof.
FIGURE 27 is a side elevational view of the severing mechanism of FIGURE 26.
FIGURE 28 is a detail sectional view of one of the pair of shoulder ring means for applying the tread edges or wings of a tire tread to the carcass of the tire.

Referring again to FIGURE 15, it will be seen that the sheet material 165 may be formed with its end portions 178 and 179 and center portion 180 of less thickness than the intermediate portions 182 and 183, and in which the intermediate portion 182 tapers from its center toward the end 178 and center portion 180, and in which intermediate portion 183 tapers from its center toward the end 179 and center portion 180 of sheet 165. With sheet material 165 thus applied to the side wall drum bladder 162 the aforementioned side wall plates 16 and 17 are disposed relative to drum 20 in a position shown in FIGURES 1 and 14 at which they extend radially outwardly at the beads 159 and 160 of bladder 162. Air under pressure is then admitted through passageway means 163 of shaft means 22 into chamber 164 to initiate radial displacement of bladder 162 radially outwardly between the inner surfaces of side wall plates 16 and 17 together with the sheet material 165 thereon as shown in FIGURE 22. Preferably, the inner surfaces of the side wall plates 16 and 17 have an adhesive applied thereto which, as will be described provides for the support thereon of side wall component for a tire to be formed from the sheet material 165. As to bladder 162 and sheet material 165 are further radially displaced, beads 159 and 160, as shown in FIGURE 23 are moved axially toward each other so as to lay the sheet material 165 onto the inner surfaces of the side wall plates 16 and 17. In FIGURE 24 the bladder 162 has been displaced to its maximum radial extent between side wall plates 16 and 17 and the bead rings 159 and 160 are at their innermost positions with respect to each other. The sheet material 165 has thus been formed into an annular member defined by annular side wall portions 184 and 186 applied to the inner surfaces of the side wall plates 16 and 17, respectively, with the center portion 180 of sheet material 165 forming an integral connecting portion at the outer circumference of the annular member. The inner peripheries of the annular side wall portions 184 and 186 are defined by the end portions 178 and 179, respectively, of the sheet material 165. Thereafter, the side wall plates 16 and 17, as shown in FIGURE 25, are moved slightly axially away from each other and the bladder 162 collapsed and withdrawn from between the plates 16 and 17 by relaxing of air under pressure from chamber 164 and moving bead rings 159 and 160 axially away from each other to return to their starting positions shown in FIGURE 14 in which the bladder 162 is returned to its original cylindrical configuration.

With the sheet material 165 disposed in the position last described, severing means 190 as shown in FIGURES 26 and 27 is disposed in juxtaposition of the central or integral connecting portion 180 of the sheet material 165 so as to sever the material thereat to provide for a side wall component for a tire at the inner surfaces of each of the side plates 16 and 17. The severing means 190 may, for example, comprise an electrical heating unit 192 for heating a knife 193 mounted on a shaft 194 carried by the heating unit. The tip or cutting edge 195 is adapted to be positioned between the side wall plates 16 and 17 to sever the center or integral connecting portion 180 of the sheet 165 and to divide the latter into the two annular side disc components one at each of the inner surfaces of the side plates 16 and 17. With the side wall components thus formed, the drum assembly 20 may be removed from its position within the center openings of the side plates 16 and 17 for subsequent application of the tire side wall components to a tire carcass in the manner described below.

Shoulder ring means for applying tread edges or wings and outer circumferential edges of tire side walls to tire carcass The aforementioned shoulder ring means 10 and 11 each are of like construction in view of which shoulder ring means 10 only will be described in connection with FIGURE 28 of the drawings. As shown in the figure last referred to, shoulder ring means 10 comprises an outer annular tread shoulder plate 200 of rigid material, such as metal, and an inner annular wing tread engaging member 202 of resilient material such as rubber. A plurality of spring assemblies 203 are mounted externally of shoulder plate 200 and comprise guide rods 204 and 205 fixed at their inner ends to tread engaging member 202 and projecting through shoulder plate 200 and into a housing 206 fixed to shoulder plate 200. Compression springs 207 within housing 206 extend axially of each of the rods 204 and 205 and tend to axially separate the shoulder plate 200 and tread engaging member 202. The shoulder plate 200 is formed with an annular recess 208 extending inwardly of the outer surface thereof to receive side wall plate 16 for purposes to be described. The tread engaging member 202 is provided with an axially outwardly extending flexible flange 209 which is adapted to be engaged and displaced by the annular tapered surface 210 at the inner periphery of shoulder plate 200.

Figure 29:
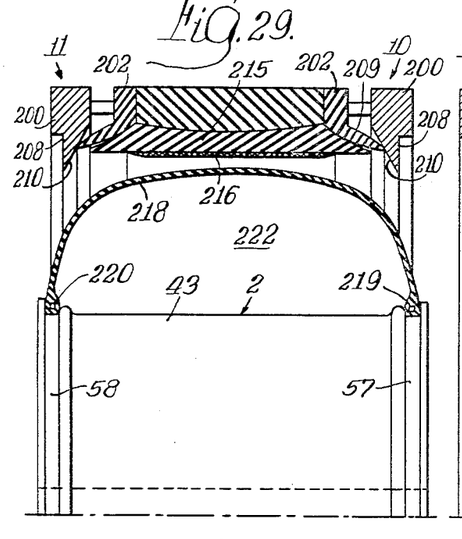
FIGURE 29 is a largely diagrammatic view showing a tread component comprising a tread and tread ply mounted in the tread component supporting structure of the invention together with a tire carcass mounted on the drum of the carcass drum assembly of the invention and positioned for assembling the tread component to the crown portion of the tire carcass.
Figure 30:
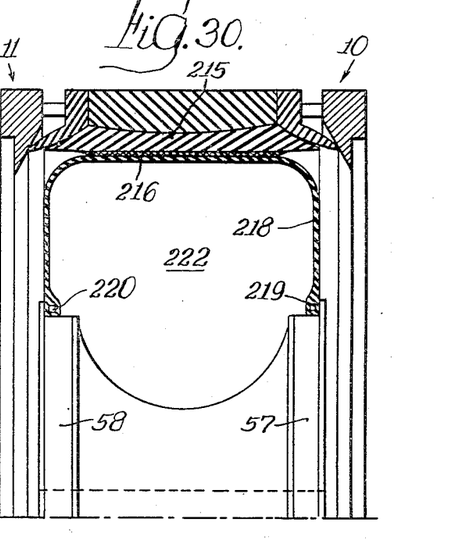
FIGURE 30 is a view similar to FIGURE 28 showing the tire carcass and tread component assembled with each other.

Typical operation of apparatus for assembling a tread component and side wall components to a tire carcass Reference may now be had to FIGURES 1 and 29 through 36 for a description of a typical operation of assembling tread, tread ply and side wall components to a tire carcass. Initially, the desired tread and tread ply members for a tread component for a tire, such as shown in FIGURE 29 at 215 and 216, respectively, are preassembled and arranged in the tread component supporting structure or means 1 in the opened position of the latter. The tread component supporting structure is then closed to hold the tread 215 and tread ply 216 in stationary position. Shoulder ring means 10 and 11 are then disposed to their operative positions at which one each is positioned at opposite sides of the tread component supporting structure or means 1 as shown in FIGURE 29 and the shoulder plate members 200 are then moved axially toward each other to engage the tapered surfaces 210 thereof with the outwardly axially projecting tips of the flange 209 of tread engaging members 202 to keep the tread ply component centered in the tread component supporting structure or means 1. A suitable preformed tire carcass, as shown at 218 in FIGURE 29 is then mounted on the bladder 43 of carcass supporting drum assembly 2 with the drum assembly supported on shaft means 3 and laterally of the tread components supporting structure as in the position of the components shown in FIGURE 1. The carcass 218 is positioned so that the portions thereof at beads 219 and 220 extend around the bead ring seat members 57 and 58, respectively, which are then radially expanded through actuation of the bead ring seating means 60 and 62 (as seen in FIGURE 6) to hold the beads of the tire carcass 218 in proper position at the ends of bladder 43. The bead moving means 75 of FIGURES 7 and 8 is then actuated to axially spread apart the beads 219 and 220 and to impart a cylindrical configuration to the bladder 43 of the carcass drum assembly 2 as shown in FIGURE 29. Thereafter, shaft means 3 with carcass drum assembly 2 supported thereon are moved to the left as viewed in FIGURE 1 to center the latter in the tread component supporting structure 1 and to the position as shown in FIGURE 29. Air under pressure is then admitted through the ported end extension 100 of shaft means 3 as before described in connection with FIGURES 9, 10 and 11 to provide for the passage of air through open valve assembly 27, bore 122, branch bore 123 and conduit 125 through valve or orifice 120 in bladder 43 to a chamber 222 formed by the outer surface of bladder 43 and the inner surface of the carcass 218. Upon admission of air under pressure into chamber 222, the bead rings 219 and 220 and bead ring seat members 57 and 58 are moved axially toward each other from the position shown in FIGURE 29 to the position of FIGURE 30. The carcass 218 is thus radially outwardly displaced until the crown portion thereof abuts and engages the inner annular surface of the tread ply 216. The aforedescribed racks and pinions of the bead spreading means 75 serve to keep the tire carcass 218 centered at all times with the tread 215 and tread ply 216 and the tread component supporting structure 1. After tacking or stitching of the crown portion of carcass 218 to the tread ply 216 air under pressure in chamber 222 is released.

Figure 31:
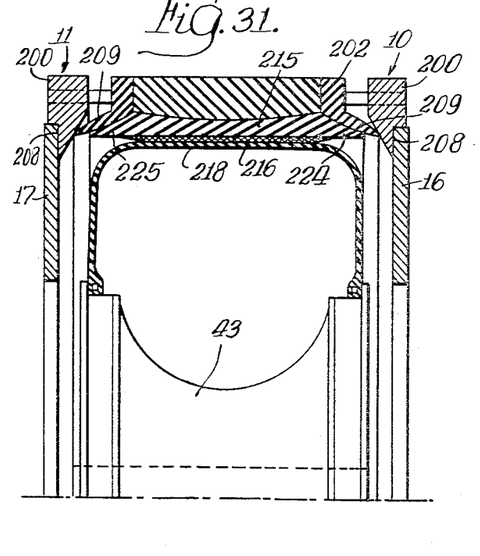
FIGURE 31 is a view similar to FIGURE 29 showing shoulder rings and side wall plates in position for applying the tread edges or wings of a tire tread to the tread shoulder portions of a tire carcass.
Figure 32:
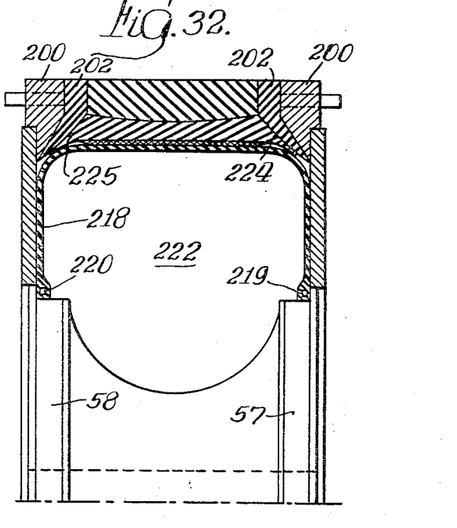
FIGURE 32 is a view similar to FIGURE 30 showing the positions of the shoulder rings and side wall plates at which the tread edges or wings of the tread are applied to the shoulder portions of the tire carcass.

After release of air under pressure from chamber 222 the carcass supporting drum assembly 2 is alternately supported on the ends of shaft means 3 and 4 so as to provide for positioning, as shown in FIGURE 31 of side wall plates 17 and 16, respectively, to their operative positions at opposite sides of the shoulder plates 200. The side wall plates 16 and 17 are then moved axially toward each other to seat in the annular recesses 208 of shoulder plates 200. It should be noted at this juncture that the side wall plates 16 and 17 do not have tire side wall material thereon, but serve as pressure supports for the shoulder plates 200. Inward axial movement of side wall plates 16 and 17 toward each other is continued which, as shown in FIGURE 32 move the shoulder plates 200 axially toward each other causing the flexible flange portions 209 of the tread engaging members 202 to engage the circumferential tread edges or wings 224 and 225 of the tread 215 with the tread shoulders of the tire carcass 218. At this point, air under pressure may again be admitted through shaft means 3 as before described into chamber 222 to effect a positive seal or stitching between the tread and tread ply to the tire carcass after which the air under pressure is again released.

After laying down of the circumferential tread edges or wings 224 and 225 on the tire carcass 218 the side wall plates 16 and 17 by again alternately supporting the drum assembly 2 of shaft means 3 and 4 are moved to positions away from the tread component supporting structure 1, and the shoulder ring means 10 and 11 are also moved to their inoperative positions as shown in FIGURE 1. With the side wall plates 16 and 17 in the positions shown in FIGURE 1, the side wall building assembly above described in connection with FIGURES 14 through 26 may be operated to fabricate and apply a side wall component for the tire to the inner surfaces of each of side wall plates 16 and 17. Alternately, however, if desired, preformed side wall plates may be otherwise fabricated and applied to the inner surfaces of side wall plates 16 and 17 while disposed in positions away from the tread component supporting structure 1.

Figure 33:
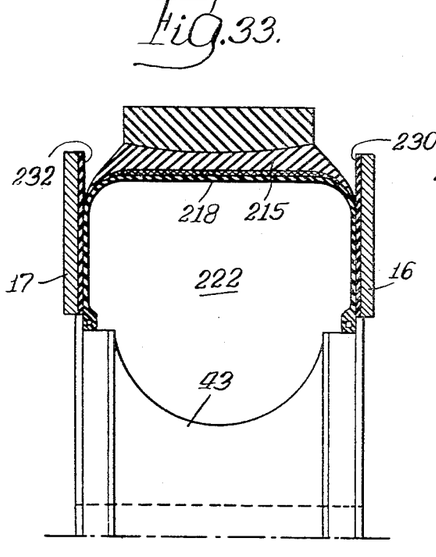
FIGURE 33 is a view showing side wall plates having side wall components thereon in a position for applying the side wall components to the tire carcass.
Figure 34:
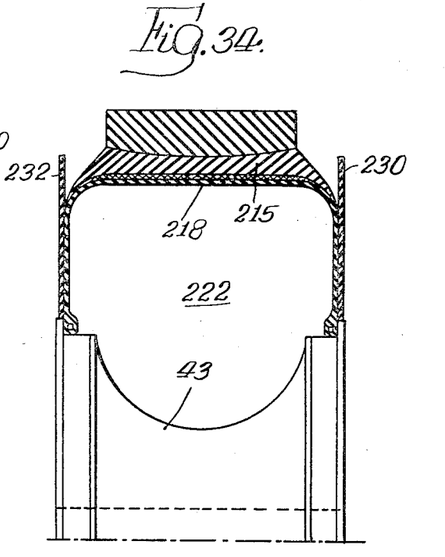
FIGURE 34 is a view similar to FIGURE 32 with the side wall plates moved away from the tire carcass and with the inner portions of the side walls attached to the sides of the tire carcass.
Figure 35:
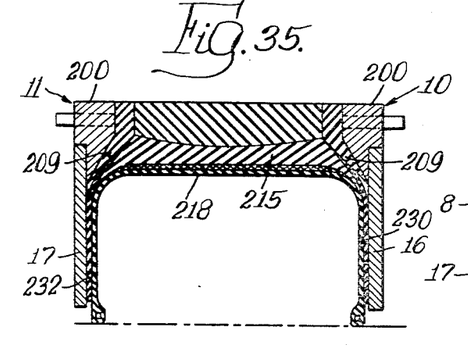
FIGURE 35 is a view showing the shoulder rings and side wall plates in position for applying the outer peripheral edges of the side walls upon the tread edges or wings of the tread of the tire.
Figure 36:
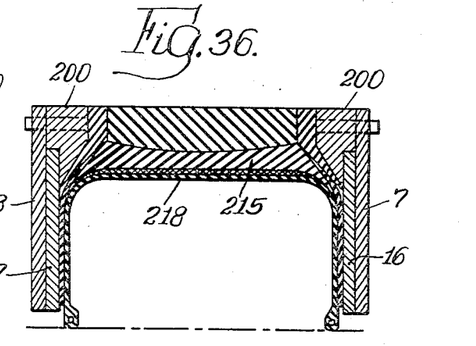
FIGURE 36 is a view similar to FIGURE 34 showing additionally the position of compression rings to provide for stitching of the several components of the tire by air under pressure in the bladder of the drum of the tire carcass drum assembly.

After application of a side wall component, such as shown in FIGURE 33 at 230 and 232, to the inner surfaces of side wall plates 16 and 17, the side wall plates 16 and 17 again by alternately supporting drum assembly 2 on shaft means 3 and 4, are moved to their operative positions one at each side of the tread component supporting structure 1. The side wall plates 16 and 17 are then moved axially toward each other and air under pressure is again admitted to chamber 222 to attach major portions at the inner circumference of the side walls 230 and 232 to the sides of the carcass 218. Thereafter, air under pressure from chamber 222 is released. Following the last noted operation, the side wall plates 16 and 17 are again moved away from the tread component supporting structure 1, by alternately supporting the carcass drum assembly on shaft means 3 and 4, leaving the side wall components 230 and 232 partially attached to the sides of the tire carcass as shown in FIGURE 34. Thereafter, and as illustrated in FIGURE 35 the shoulder ring means 10 and 11 are moved to their operative positions after which side wall plates 16 and 17 are moved to their operative positions, by alternately supporting the carcass drum assembly on shaft means 3 and 4, and the side wall plates 16 and 17 moved axially toward each other which causes the flexible flanges 209 of the tread engaging members 202 to engage the outer circumferential edge portions of the side walls 230 and 232 and lay them down at the tread shoulders of the tire carcass and over the circumferential tread edges or wings of the tread 215. Thereafter, the compression rings 7 and 8 carried on shafts slidably supported on shaft means 3 and 4, respectively, are moved axially toward each other into engagement with side wall plates 16 and 17 and the chamber 222 again charged with air under pressure to tightly seal or stitch the several components of the tire together. After the several components have thus been securely connected, air under pressure is released from chamber 222 and compression rings 7 and 8, side wall plates 16 and 17, and shoulder ring means 10 and 11 are then all disposed to positions away from the tread and tread ply supporting structure 1 to their positions as shown in FIGURE 1 and the tread component supporting structure 1 is then opened. After opening of the tread component supporting structure 1, the carcass drum assembly 2 and shaft means 3 on which it is now supported are moved axially away therefrom to the position shown in FIGURE 1 and the bead seating members 57 and 58 are relaxed by releasing air under pressure from the bead ring seating means 60 and 62 upon which the completed tire is removed from the bladder of the carcass drum assembly 2. The parts are now in position for forming a succeeding tire by repeating the foregoing described operations.

While there has been shown and described a preferred apparatus in accordance with the present invention, it will be understood that various modifications and rearrangements may be made therein without departing from the spirit and scope of the invention.

The invention claimed is:

1. An apparatus for assembling tread and carcass components for a tire comprising the combination of tread component supporting means for supporting said tread component with its circumferential edges lying laterally at opposite sides of said tread component supporting means, carcass supporting means including a bladder for supporting said carcass component in alignment with and radially inwardly of said tread component, a pair of shoulder ring means movable to operative and inoperative positions and in said operative positions thereof being movable toward each other to engage opposite circumferential edges of said tread component, and means for radially outwardly displacing said carcass component to engage a portion of the outer surface thereof with the inner surface of said tread component between the circumferential edges of the latter.

2. An apparatus for assembling tread and carcass components for a tire comprising the combination of tread component supporting means for supporting said tread component with its circumferential edges extending laterally outwardly at opposite sides of said tread component supporting means, carcass supporting means including a bladder for supporting said carcass component in alignment with and radially inwardly of said tread component, a pair of shoulder ring means movable to operative and inoperative positions and in said operative positions being movable toward each other to engage opposite circumferential edges of said tread component, means for radially outwardly displacing said carcass component to engage a portion of the outer surface thereof with the inner surface of said tread component, and a pair of side wall plate means movable to first and second positions and in said second positions engaging one each of said shoulder ring means for moving the latter toward each other to lay said circumferential edges of said tread component on said carcass component.

3. An apparatus for assembling tread, side wall, and carcass components for a tire comprising the combination of tread component supporting means for supporting said tread component with its circumferential edges extending laterally outwardly at opposite sides of said tread component supporting means, carcass supporting means including a bladder for supporting said carcass component in alignment with and radially inwardly of said tread component, a pair of shoulder ring means movable to operative and inoperative positions and in said operative positions being movable toward each other to a first inward position to engage the opposite circumferential edges of said tread component, means for radially outwardly displacing said carcass component to engage a portion of the outer surface thereof with the inner surface of said tread component, a pair of side wall plate means movable to first and second positions and in said second positions engaging one each of said shoulder ring means in said operative positions thereof for moving the latter toward each other to a second inward position to lay said circumferential edges of said tread component on said carcass component, said side wall plate means in their said second positions being adapted to have said side wall components applied thereto and upon movement to said first position with said shoulder ring means in their said inoperative positions applying inner portions of said side wall components to said carcass component, said shoulder ring means being movable from their said inoperative positions to their said operative positions for engaging one each of said side wall components, and said side wall plate means being movable from their said first position to their said second positions for engaging one each of said shoulder ring means to lay the outer circumferential edge portions of said side wall components at said circumferential edges of said tread component.

4. The apparatus of claim 3 characterized by the provision of pressure plate means for holding said shoulder ring means and said side plate means in the operative and second positions thereof, respectively, and means for admitting air under pressure between the outer surface of said bladder and the inner surface of said carcass component to firmly seal said tread, side wall and carcass components together.

5. An apparatus for assembling tread and carcass components for a tire comprising the combination of tread component supporting means for said tread component, carcass supporting drum means for supporting said carcass component in alignment with said tread component, shoulder ring means for engaging opposite circumferential edges of said tread component to retain the latter in position in said tread component supporting means, means for radially and axially displacing said carcass component to engage the outer surface of the crown portion of said carcass component with the inner surface of said tread component, and side wall plate means for engaging said shoulder ring means for moving the latter to lay said circumferential edges of said tread component on said carcass on the tread shoulders of said carcass component.

6. An apparatus for assembling a tread component and a carcass component having axially spaced apart bead rings for a tire comprising the combination of tread component supporting means for said tread component, carcass supporting drum means including a bladder for supporting said carcass component in alignment with and radially inward of said tread component, said carcass supporting drum means having bead ring seats at opposite ends of said bladder for said bead rings of said carcass component, means for sealingly engaging said bead ring seats with said carcass component at said bead rings, means for admitting fluid under pressure between the outer surface of said bladder and the inner surface of said carcass component to displace said carcass component radially outwardly, and means for uniformly moving said bead ring seats axially toward each other upon the radial outward displacement of said carcass component to thereby engage the outer surface of the crown portion of said carcass component with the inner surface of said tread component.

7. An apparatus for assembling a tread component and a carcass component having axially spaced apart bead rings for a tire comprising the combination of tread component supporting means for said tread component, carcass supporting drum means including a displaceable bladder for supporting said carcass component in alignment with and radially inwardly of said tread component, said carcass supporting drum means having bead ring seats at opposite ends of said bladder for said bead rings of said carcass component, means for sealingly engaging said bead ring seats with said carcass component at said bead rings, a pair of shoulder ring means each including an inner member having a flexible flange and outer rigid member movable relative to said inner member for engaging said annular flange, means for normally biasing said inner and outer members away from each other, said shoulder ring means being movable to operative and inoperative positions and in their operative positions being movable toward each other to engage the flanges of said inner members with opposite circumferential edges of said tread component, means for admitting fluid under pressure between the outer surface of said bladder and the inner surface of said carcass component to displace said carcass component radially outwardly and said bladder radially inwardly, means for uniformly moving said bead ring seats axially toward each other upon the radial outward displacement of said carcass component and the radial inward displacement of said bladder to thereby engage the outer surface of the crown portion of said carcass component with the inner surface of said tread component, and a pair of side wall plate means movable to first and second positions and in said second position engaging one each of said rigid members of said shoulder ring means for moving said rigid member into engagement with said flexible flanges of said inner members of said shoulder ring means to lay said circumferential edges of said tread component on the tread shoulders of said carcass component.

8. The apparatus of claim 7 characterized by said side wall plate means in their said first positions being adapted to have tire side wall components applied thereto and upon movement to their said first position with said shoulder ring means in their said inoperative positions applying the inner portions of said side wall components to said carcass component, said shoulder ring means being movable from their said inoperative positions to their said operative positions for engaging one each of said side wall components, and said side wall plate means being movable from their said first positions to their said second positions for engaging said rigid members of said shoulder ring means for moving said rigid members into engagement with said flexible flanges of said inner members of said shoulder ring means to lay the circumferential edges of said side wall components over the circumferential edges of said tread component at said tread shoulders of said tread component.

9. A drum assembly for tire building apparatus comprising, a drum hub, a pair of end head components mounted for relative axial movement toward and away from each other on said drum hub, said end head components each comprising an inner ring member and an outer end member movable relative to each other, a bladder connected at its opposite ends to the inner ring members of said end head components, annular bead ring seats between said inner ring members and said outer end members of said end head components, and bead ring seating means for axially moving said inner ring member toward said outer end member of each of said end head components to radially outwardly displace said bead ring seats.

10. A drum assembly for tire building apparatus comprising, a drum hub, a pair of end head components mounted for relative axial movement toward and away from each other on said drum hub, said end head components each comprising an inner ring member and an outer end member movable relative to each other, a bladder connected at its opposite ends to the inner ring members of said end head components, a fluid orifice in said bladder, annular bead ring seats between said inner ring member and outer end members of said end head components, bead ring seating means for axially moving said inner ring member toward said outer end member of each of said end head components to radially outwardly displace said bead ring seats, fluid passageway means for said drum hub, and means connecting said fluid passageway means to said fluid orifice of said bladder.

11. A drum assembly for tire building apparatus comprising, a drum hub, a pair of end head components mounted for relative axial movement toward and away from each other on said drum hub, said end head components each comprising an inner ring member and an outer end member movable relative to each other, a bladder connected at its opposite ends to the inner ring members of said end head components, annular bead ring seats between said inner ring member and said outer end member of said end head components, bead ring seating means for axially moving said inner ring member toward said outer end member of each of said end head components to radially outwardly displace said bead ring seats, and means for moving said end head components toward and away from each other.

12. In tire building apparatus the combination of drum supporting shaft means having fluid passageway means for passage of fluid under pressure therethrough, a drum hub, fluid passageway means for said drum hub, valve means for said fluid passageway means of said drum hub, means for mounting said drum hub on said drum supporting shaft means, means between said drum supporting shaft means and said valve means for opening the latter in the supported position of said drum hub on said drum supporting shaft means, a pair of end head components mounted for relative axial movement toward and away from each other on said drum hub, a bladder connected at its opposite ends to said end head, an orifice in said bladder, and fluid passageway means extending from the fluid passageway means of said drum hub to said orifice of said bladder.

13. In tire building apparatus the combination of drum supporting shaft means having fluid passageway means for passage of fluid under pressure therethrough, a drum hub, fluid passageway means for said drum hub, valve means for said fluid passageway means of said drum hub, means for mounting said drum hub on said shaft means, means between said drum supporting shaft means and said valve means for opening the latter in the supported position of said drum hub on said drum supporting shaft means, a pair of end head components mounted for relative axial movement toward and away from each other on said drum hub, said end components each comprising an inner ring member and an outer end member movable relative to each other, a bladder connected at its opposite ends to said inner ring members of said end head components, an orifice in said bladder, annular bead ring seats between said inner ring members and said outer end members of said end head components, means for moving said inner ring member toward said outer end member of each of said end head components to radially outwardly display said bead ring seats, and fluid passageway means extending from the fluid passageway means of said drum hub to said orifice of said bladder.

14. In tire building apparatus the combination of a pair of drum supporting shaft means having fluid passageway means for passage of fluid under pressure therethrough, a drum hub, fluid passageway means extending between opposite ends of said drum hub, normally closed valve means at the opposite ends of said fluid passageway means of said drum hub, clamp means for mounting said drum hub selectively on one or the other of said drum supporting shaft means, means between said drum supporting shaft means and said valve means for opening the latter in a supported position of said drum hub on either of said drum supporting shaft means, a pair of end head components mounted for relative axial movement toward and away from each other on said drum hub, said end components each comprising an inner ring member and an outer end member movable relative to each other, a bladder connected at its opposite ends to said inner ring members of said end head components, an orifice in said bladder, annular bead ring seats between said inner ring member and said outer end members of said end head components, means for moving said inner ring member toward said outer end member of each of said end head components to radially outwardly display said bead ring seats, and fluid passageway means extending from the fluid passageway means of said drum hub to said orifice of said bladder.

15. In tire building apparatus the combination of a pair of drum supporting shaft means having fluid passageway means for passage of fluid under pressure therethrough, a drum hub, fluid passageway means extending between opposite ends of said drum hub, normally closed valve means at the opposite ends of said fluid passageway means of said drum hub, clamp means at opposite ends of and for mounting said drum hub selectively on one or the other of said drum supporting shaft means, means for closing the clamp means at one end of said drum hub in the mounting thereof on one of said drum supporting shaft means and for opening the clamp means at the other end of said drum hub, means between said drum supporting shaft means and said valve means for opening the latter in the supported positions of said drum hub on either of said drum supporting shaft means, a pair of end head components mounted for relative axial movement toward and away from each other on said drum hub, said end components each comprising an inner ring member and an outer end member movable relative to each other, a bladder connected at its opposite ends to said inner ring members of said end head component, an orifice in said bladder, annular bead ring seats between said inner ring member and said outer end members of said end head components, means for moving said inner ring member toward said outer end member of each of said end head components to radially outwardly display said bead ring seats, and fluid passageway means extending from the fluid passageway means of said drum hub to said orifice of said bladder.

16. In a tire side wall building apparatus the combination of a side wall drum assembly comprising drum shaft means, a pair of end plates mounted for movement toward and away from each other axially of said shaft means, and a bladder extending between said end plates means for supporting tire side wall material around the outer surface thereof, a pair of side wall plates movable toward and away from each other axially of said drum shaft means, means for radially outwardly displacing said bladder upon movement of said side wall plates toward each other to dispose said side wall material on said bladder into an annular member defined by annular side wall portions at each of the inner surfaces of said side wall plates and an integral connecting portion at the outer circumference of said annular member, and severing means for severing said integral connecting portion of said annular member to provide separate tire side walls at the inner surfaces of each of said side wall plates.

17. In a tire side wall building apparatus the combination of a side wall drum assembly comprising drum shaft means, a pair of end plates mounted on said shaft means for movement toward and away from each other axially of said drum shaft means, and a displaceable bladder extending axially of said drum shaft means and connected at its opposite ends to said end plates, said bladder with said end plates in positions away from each being of cylindrical form for supporting tire side wall material in the form of a cylinder around the outer surface thereof, means for admitting fluid under pressure into said drum assembly to radially outwardly displace said bladder and move said end plates axially toward each other, a pair of side wall plates extending radially outwardly of said bladder and said end plates movable toward and away from each other axially of said drum shaft means and upon movement toward each other upon radial outward displacement of said bladder forming said side wall material on said bladder into an annular member defined by annular side wall portions at each of the inner surfaces of said side wall plates and an integral connecting portion at the outer circumference of said annular member, and severing means for severing said integral connecting portion of said annular member to provide separate tire side walls at the inner surfaces of each of said side wall plates.

18. In a tire side wall building apparatus the combination of a side wall drum assembly comprising drum shaft means, air passageway means for said drum shaft, a pair of end plates mounted on said shaft means for movement toward and away from each other axially of said drum shaft means, and a bladder extending coaxially of said shaft means and connected at its opposite ends to said end plates, said drum shaft means, said end plates and said bladder forming an air chamber for receiving air under pressure through said air passageway means of said drum shaft means, said bladder with said end plates in position away from each other being of cylindrical form for supporting tire side wall material in the form of a cylinder around the outer surface thereof, said bladder upon admission of air under pressure into said chamber being radially outwardly displaced and said side wall plates moved toward each other, a pair of side wall plates extending radially outwardly of said bladder and said end plates movable toward and away from each other axially of said drum shaft means and upon movement toward each other upon radial outward displacement of said bladder forming said side wall material on said bladder into an annular member defined by annular side wall portions at each of the inner surfaces of said side wall plates and an integral connecting portion at the outer circumference of said annular member, and severing means movable between said side wall plates comprising a heated knife for severing said integral connecting portion of said annular member to provide separate tire side walls at the inner surfaces of each of said side wall plates.

19. In a tire side wall building apparatus the combination of a side wall drum for receiving therearound side wall sheet material having first and second edges formed with first and second bevels adapted to overlap and mate with each other, stitching means comprising a pressing plate for positioning below the bevel edges of said side wall sheet material and upon which the edge portion at one of said bevel edges is adapted to be disposed, a first presser bar movable to operative and inoperative positions and in its operative position being engageable by the bevel edge at the other of the edge portions of said tire side wall material to align the same with said one bevel edge, said first presser bar being movable to its inoperative position to permit said other bevel edge to engage and overlap said one bevel edge, a second presser bar movable to operative and inoperative positions and in its operative position engaging said side wall sheet material at the edge portion thereof adjacent said other bevel edge to retain the same in position on said pressing plate, said first presser bar being movable from its inoperative to its operative position to engage the edge portion of said side wall sheet material adjacent said one bevel edge to hold the same in position on said pressing plate, and a third presser bar between said first and second presser bars movable between operative and inoperative positions and in its operative position engaging and stitching together the overlapped bevel edges at the edges of said side wall sheet material.

References Cited

UNITED STATES PATENTS

| | | | |
|---|---|---|---|
| 3,346,434 | 10/1967 | Fulton | 156—415 |
| 3,360,418 | 12/1967 | Novikov et al. | 156—403 |
| 3,364,093 | 1/1968 | Porter | 156—416 X |
| 2,822,025 | 2/1958 | Hollis | 156—127 |
| 2,871,912 | 3/1959 | Kraft | 156—126 |
| 2,936,813 | 5/1960 | Haase | 156—126 |
| 3,053,308 | 9/1962 | Vanzo et al. | 156—416 |
| 3,101,289 | 8/1963 | Giletta et al. | 156—416 X |
| 3,134,079 | 5/1964 | Giletta et al. | 156—416 X |
| 3,219,510 | 11/1965 | Frazier | 156—127 X |

HAROLD ANSHER, *Primary Examiner.*